US00RE33981E

United States Patent [19]

Nilsson

[11] E Patent Number: Re. 33,981

[45] Reissued Date of Patent: Jun. 30, 1992

[54] ARRANGEMENT FOR PREVENTING MIST AND ICE FORMATION ON THE SIDE WINDOW OF A MOTOR VEHICLE

[75] Inventor: Sten Nilsson, Vanersborg, Sweden .

[73] Assignee: Saab Automobile AB, Sweden

[21] Appl. No.: 576,684

[22] PCT Filed: Sep. 21, 1987

[86] PCT No.: PCT/SE87/00422

§ 371 Date: May 17, 1988

§ 102(e) Date: May 17, 1988

[87] PCT Pub. No.: WO88/02318

PCT Pub. Date: Apr. 7, 1988

Related U.S. Patent Documents

Reissue of:

[64] Patent No.: 4,903,581
Issued: Feb. 27, 1990
Appl. No.: 201,123
Filed: Sep. 21, 1987

[30] Foreign Application Priority Data

Oct. 1, 1986 [SE] Sweden ..... 8604163

[51] Int. Cl.[5] ..... B60S 1/54
[52] U.S. Cl. ..... 454/124
[58] Field of Search ..... 98/2.04, 2.09, 90

[56] References Cited

U.S. PATENT DOCUMENTS

| | | | |
|---|---|---|---|
| 2,096,901 | 10/1937 | Knecht | 98/2.09 |
| 2,523,923 | 9/1950 | Rodert | 98/2.04 |
| 4,432,213 | 2/1984 | Katahira et al. | 98/2.15 X |
| 4,512,240 | 4/1985 | Mahler et al. | 98/2.04 |

FOREIGN PATENT DOCUMENTS

| | | | |
|---|---|---|---|
| 2636640 | 2/1978 | Fed. Rep. of Germany | 98/2.04 |
| 2750671 | 5/1979 | Fed. Rep. of Germany | 98/2.04 |
| 16347 | 5/1975 | Japan . | |
| 16348 | 5/1975 | Japan . | |
| 14513 | 1/1984 | Japan | 98/2.04 |
| 2107854 | 5/1983 | United Kingdom | 98/20.09 |

*Primary Examiner*—Harold Joyce
*Attorney, Agent, or Firm*—Ostrolenk, Faber, Gerb & Soffen

[57] ABSTRACT

An arrangement for preventing mist and ice formation on the side window of a motor vehicle, primarily a rear side-window in the door of the vehicle. A fan, an inlet duct and an outlet air supply duct are arranged between an outer panel and an inner panel in the door of the vehicle below the window. The fan draws air from the vehicle interior through the inlet duct and blows air out toward the window which can thereby be quickly cleared of mist and ice. The outlet from the air supply duct has a plurality of outlet passages with air directed surfaces that are oriented for blowing air in different directions over the window.

13 Claims, 2 Drawing Sheets

ARRANGEMENT FOR PREVENTING MIST AND ICE FORMATION ON THE SIDE WINDOW OF A MOTOR VEHICLE

Matter enclosed in heavy brackets [ ] appears in the original patent but forms no part of this reissue specification; matter printed in italics indicates the additions made by reissue.

BACKGROUND OF THE INVENTION

The present invention relates to an arrangement for preventing mist and ice formation on a side window in a door of a motor vehicle, to which window is connected at least one air-supply duct with an outlet located at the bottom part of the window, via which duct and outlet air is fed from a fan arranged in the vehicle.

It is a generally known problem that the windows of a vehicle easily become misted and even ice up when the vehicle is used in cold weather. The ventilation system of the vehicle is rated so as to quickly free the vehicle windscreen of mist and ice, and air is also generally supplied to the adjacent front side-windows to quickly achieve good visibility through the latter.

From Swedish Patent Specification No. 209924 it is also known to supply air from a mixing box arranged in the front part of a vehicle to all the windows of the vehicle. The disadvantage of the said solution is the requirement for long air ducts and a plurality of connection couplings, which result in high pressure drops and risks of leakage. In order to achieve the effect of distinctly improving the visibility in the event of misted windows in the latter case, an extremely high fan capacity is required. To achieve this with only one large fan located centrally in the vehicle involves difficulties from the viewpoint of space, noise, etc.

Keeping the rear side-windows of a vehicle free of mist is especially problematic. One proposal for solving this problem involves arranging a smaller fan in the centre pillar of the vehicle in order to supply air through the pillar and to blow the air out towards the adjacent rear side-window. However, the solution requires special measures to be taken in a load-bearing part of the vehicle bodywork and also involves other disadvantages, such as those related to the possibility of simple installation of the air ducts and fan.

SUMMARY OF THE INVENTION

The present invention relates to a simple arrangement for achieving mist- and ice-free windows in a vehicle, especially the rear side-windows of a conventional passenger car. For this purpose the present invention is characterized in that the fan is arranged in the door side below the window between an outer bodywork panel of the door and an inner inside-wall panel of the door and in that the fan draws air through an inlet duct, the inlet of which is located in the inside-wall panel towards the vehicle interior.

The invention is furthermore characterized in that the fan, the outlet duct and the inlet duct constitute a single unit.

The positioning of the fan in the door side below the window and the integration of the fan and the duct parts into one unit result in considerable advantages. The unit can be easily and quickly installed in the vehicle and located favourably, from the point of view of noise, inside a sound absorbing inner panel, while also improving the opportunities for keeping the side windows of the vehicle free of mist and ice.

In an advantageous embodiment of the invention the unit is mounted in a rear door of the vehicle, wherein the invention is characterized in that the fan and the outlet duct are arranged in the front part of the door with the air outlet arranged at the bottom front part of the window and in that the outlet is provided with air-directing surfaces which guide the air from the outlet obliquely upwards, backwards and inwards towards the window.

By positioning the outlet close to the bottom front part of the window and also by designing it with air-directing surfaces which guide the outlet air obliquely upwards, backwards and inwards towards the window, an advantageous location from the viewpoint of installation in the door can be combined with guidance of air which is effective from the point of view of visibility.

Other features characterizing the invention emerge from the attached patent claims and the following description of an advantageous embodiment of the invention. In the description, reference is made to the attached figures.

DESCRIPTION OF A PREFERRED EMBODIMENT

Figure 1:
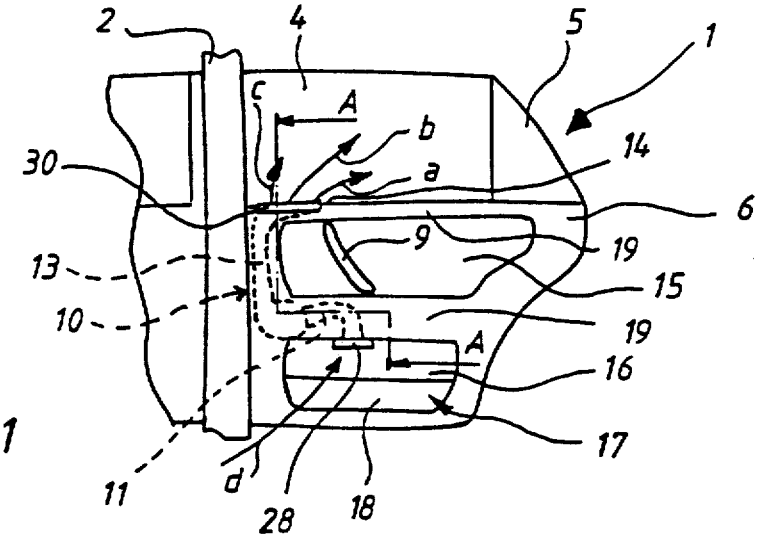
FIG. 1 illustrates schematically an arrangement according to the invention in a rear door of a motor vehicle.
Figure 2:
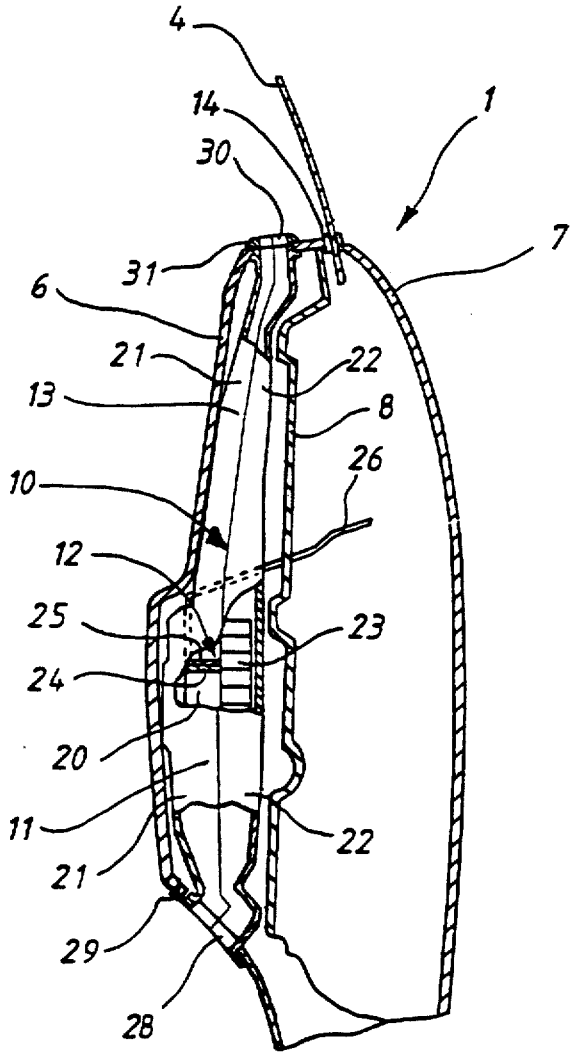
FIG. 2 illustrates schematically the arrangement according to the invention essentially according to a cross-section A—A in FIG. 1.

FIG. 1 shows a rear door 1 located directly behind the centre pillar 2 in a conventional passenger car. Door 1 has a window 4 which opens and closes vertically and a fixed window 5 together with an inner panel 6, facing towards the vehicle interior, and made of moulded wood fibre material. The panel is fixed to door 1 which is otherwise made of sheet metal. FIG. 2 shows schematically how door 1 comprises an outer sheet metal panel 7 and an inner reinforcing sheet-metal structure 8 welded thereto, to which is secured, in addition to inner panel 6, a door handle 9 and (not shown) arrangements for a door lock and a window regulator crank.

Ventilation unit 10 according to the invention is secured to the said inner panel 6 in a location in the front part of the door. Ventilation unit 10 consists of an integral unit comprising inlet duct 11, fan 12 and outlet duct 13. Outlet duct 13 has an outlet close to the front part of bottom edge 14 of window 4, while inlet duct 11 has an inlet in the bottom part of the door. The run of the said ducts is adapted to the design of inner door panel 6. Inner panel 6 is in fact designed with atop and a bottom part, 15 and 16, pressured in towards the outside of door 1, of which parts the top contains the handle 9 and locking mechanism (not shown) while the bottom forms a storage pocket 17 together with a wall element 18 located inside and facing towards the interior. The said top and bottom parts 15 and 16 are surrounded by beam-like projections in inner panel 6 which face towards the interior. The shape of ventilation unit 10 is matched to the said projections 19, for which reason it receives a well-protected location also in terms of the sound insulation of ventilation unit 10 relative to the interior.

Ventilation unit 10 consists of two housing halves 21 and 22 formed of plastic material with an essentially vertical joint face which essentially runs in or parallel to the longitudinal plane of symmetry of ducts 11, 13. Housing halves 21, 22 are attached to each other by means of snap elements (not shown) and thus also accommodate fan 12, which consists of electric motor 20 which drives impeller 23. Motor 20 is elastically mounted in rubber support 24 which in turn rests against a surrounding bearing housing 25 formed in the one housing half 21. Via cable 26 the motor obtains the necessary electrical energy from a controllable electric circuit (not shown).

The inlet to and the outlet from the ventilation unit pass through openings in the inner panel and are thus provided with inlet and outlet nozzles 28 and 30. Nozzles 28, 30 constitute separate parts which, with outer edges 29 and 31, rest against the surface of inner panel 6 that faces towards the interior, at the same time as they are connected to the outlet and inlet respectively of ducts 11, 13 by means of snap and/or separate fasteners 32. Outlet duct 13 together with the nozzle 30 provides the discharge air with a direction which is obliquely inwards towards rear side-window 4. The latter is, in a manner customary in modern cars, slightly curved and angled in such a way that its upper part is located closer to the centre of the vehicle than it lower part. This means that the direction of discharge of the air is generally almost vertical or even - as shown in FIG. 2—at a slight angle inwards towards the interior.

Figure 3:
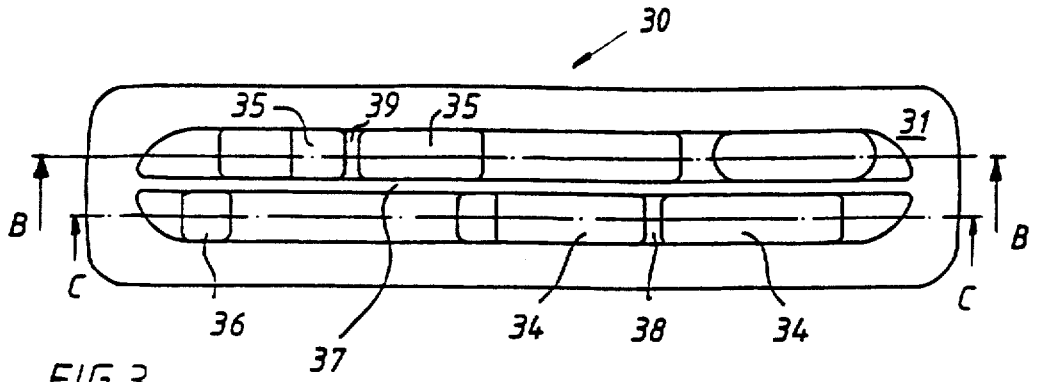
FIG. 3 shows an advantageous embodiment of the air outlet of the arrangement according to the invention viewed from above and FIGS. 4a, 4b show outlets essentially according to section B—B and section C—C in FIG. 3.
Figure 4A:
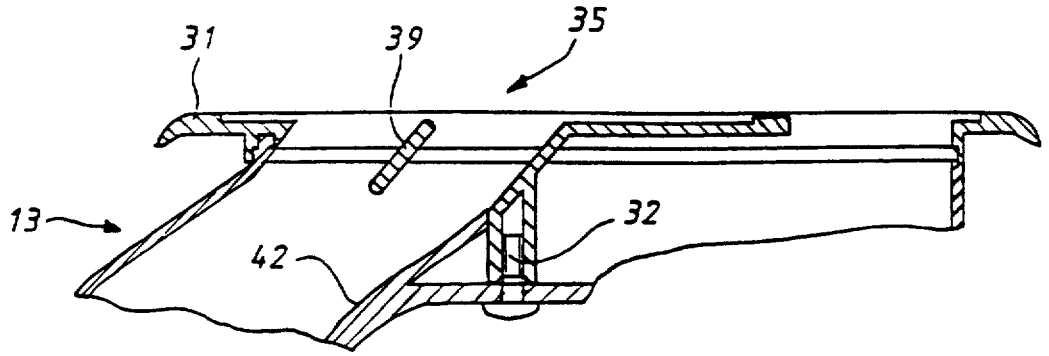
Figure 4B:
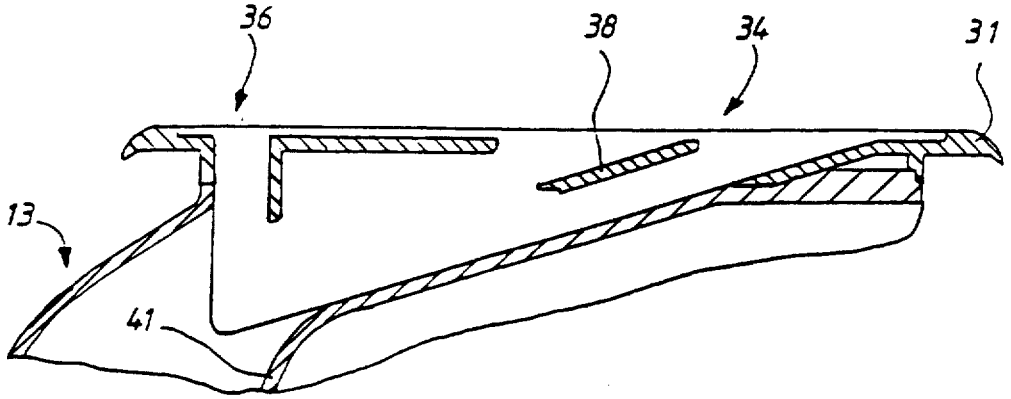

Outlet nozzle 30 shown in FIGS. 3, 4a and 4b guides the discharge air through three nozzles 34, 35 and 36, separated from each other, of which two 34, 36 are separated from the third 35 by a longitudinal central wall 37. The said two nozzles 34, 36 are situated further from window 4 than the third nozzle 35 and they moreover located in the longitudinal direction on both sides of the third nozzle 35, viewed towards the front of the vehicle.

The first and second nozzles 34, 35 each have a central guide plate 38 and 39 respectively, which, together with connected envelope surfaces 41 and 42 respectively from the corresponding design of outlet duct 13 in the respective ventilation housing half 21, 22, gives the discharge air a predetermined direction. First nozzle 34 thus gives the air a direction corresponding to arrow a in FIG. 1 and has a smaller angle relative to the horizontal plane than second nozzle 35. The direction of air flow from the said second nozzle 35 is shown by arrow b in FIG. 1. The third nozzle 36 consists of an essentially vertical hole which gives the exhaust air a corresponding vertical direction corresponding to arrow c in FIG. 1. The design of outlet nozzle 30 thus provides several separate air streams which, without disturbing each other to any great extent, flow over the whole window 4. By this means, a completely mist-free window is achieved in a relatively short time, starting at a central front part at eye-level of the back seat passenger In addition, inlet 28 of ventilation unit 10 is advantageously located in such a way as to capture an air stream (arrow d) from the ventilation air ducts which, in passenger cars, usually discharge under the front seats. The said air stream d originates from the regular ventilation system (not shown here) of the vehicle and supplies, when required, heated air to the footwells for the back seat passengers. The ventilation unit according to the invention can consequently capture the heated air and convey it further at increased pressure to the rear side-window, which consequently increases the possibility of quickly achieving good visibility through the latter. Nor, of course, should the possibility be excluded here of incorporating separate electrical heating in ventilation unit 10.

The electrical control of fan 12 of ventilation unit 10 can expediently be carried out at the same time as the control of the fan of the regular ventilation system. It can also follow switching of an electric heating arrangement for the rear window of the vehicle and/or a separate switch on the corresponding door. It is also possible to control the fan by a sensor which senses the presence of mist. The exemplary embodiment described should not thus be regarded as limiting the present invention, but rather it can be modified in a number of embodiments within the scope of the patent claims which follow.

I claim:

1. Arrangement for preventing mist or ice formation on a side window of a motor vehicle, the window having a bottom part, the motor vehicle having a [body part] *door* beneath the bottom part of the window, *the door comprising an outer bodywork panel, a reinforcing structure and an inside wall panel toward the interior of the vehicle;* an air supply duct disposed in the [body part] *door between the reinforcing structure and the inside wall panel,* the air supply duct having an *inlet section and an outlet section, the outlet section having an* outlet located at the bottom part of the window, an air blowing fan [arranged in the body part below the window, the fan communicating into the air supply duct for feeding air therethrough] *mounted in the air supply duct between the inlet section and the outlet section for feeding air through the outlet section,* and the air supply duct outlet being aimed for blowing air therethrough onto the window above the air supply duct outlet;

[the vehicle body part having an inside wall panel toward the interior of the vehicle; an inlet duct] *the air supply duct inlet section* having an inlet thereto defined in the inside wall panel [toward the vehicle interior and the inlet duct communicating with the fan] for supplying air to the fan *through the air supply inlet section.*

2. The arrangement of claim 1, wherein the [body part] *door* has a bottom, the inside wall panel has a bottom region toward the bottom of the [body part] *door* interior and the inlet to the inlet [duct] *section* is located toward the bottom region of the inside wall panel.

[3. The arrangement of claim 2, wherein the vehicle body part additionally has an outer body work panel spaced outwardly of the inside wall panel, and the fan being disposed between the outer body work panel and the inside wall panel.]

[4. The arrangement of claim 3, wherein the inlet duct and the air supply duct are also disposed between the outer body work panel and the inside wall panel.]

[5. The arrangement of claim 3, wherein the vehicle body part comprises a door, the side window being placed in the door and the door being defined by the outer body work panel and the inside wall panel; and the air supply duct being disposed in the door.]

[6. The arrangement of claim 5, wherein the fan, the air supply duct and the inlet duct together constitute a single integral unit in the door below the window.]

7. The arrangement of claim [5] *1*, wherein the vehicle has a front and a rear and the door has a front directed toward the front of the vehicle and the rear directed toward the rear of the vehicle;

the fan and the air supply duct *outlet section* being disposed toward the front of the door, and the outlet from the air supply duct *outlet section* being disposed at the bottom part of the window toward the front of the window.

8. The arrangement of claim 7, wherein the vehicle door is the rear vehicle door of the vehicle and the fan and the air supply duct *inlet section* are arranged in the front part of the rear door of the vehicle.

9. The arrangement of claim 7, wherein the air supply duct has disposed in the outlet therefrom a plurality of air flow directing surfaces directed for guiding air out of the outlet obliquely upward from the bottom, front part of the window, rearward therefrom and also in a direction toward the window.

10. The arrangement of claim [6] *1*, wherein the [integral unit] *air supply duct* comprises first and second housing halves which are combined to define the air supply duct [and the inlet duct] and which are shaped to be joined generally along a joint face which runs along the [ducts] *duct* and runs generally parallel to the longitudinal plane of symmetry of the [ducts] *duct;* the fan comprising a fan motor mounted in one of the housing halves and [comprises] an impeller attached to the fan motor for being driven to rotate thereby; the impeller moving air from the inlet [duct] and through the air supply duct *to the outlet,* and the housing halves being shaped for accommodating the fan motor and the impeller.

11. The arrangement of claim 10, wherein the fan motor is elastically mounted to the one housing half.

12. The arrangement of claim 10, wherein the outlet from the air supply duct comprises a first nozzle in one of the housing halves and a separate second nozzle in the second of the housing halves; a wall in the outlet located generally along the joint face of the housing halves separating the first and the second nozzles.

13. The arrangement of claim 12, further comprising first air directing means in the first nozzle for directing air from the first nozzle in a first direction and second air directing means in the second nozzle for directing air from the second nozzle in a second direction different from the first direction.

14. The arrangement of claim 13, wherein the first air directing means in the first nozzle comprises first air directing surfaces in the first nozzle and the second air directing means in the second nozzle comprises different second air directing surfaces in the second nozzle, wherein the first and the second air directing surfaces are oriented to direct the air through the first and second nozzles in different respective directions.

15. The arrangement of claim 14, wherein the first and second nozzles are disposed along the bottom part of the window at respective more frontward and more rearward locations.

16. The arrangement of claim 15, wherein the second nozzle is located frontward of the first nozzle, and the second nozzle is disposed nearer to the window than is the first nozzle, the second nozzle directing surfaces being oriented to direct the air obliquely rearward at a larger angle relative to the bottom part of the window than the angle at which the first air directing surfaces direct the air rearwardly.

17. The arrangement of claim [6] *1*, wherein *the inside wall panel comprises a sound absorbing material and* the [integral unit] *air supply duct* is attached to the inside wall panel; the inside wall panel having preformed, inwardly projecting wall parts, which project inwardly toward the interior of the vehicle, and the [unit] *air supply* being disposed in the inside wall panel in the inwardly projecting wall parts.

* * * * *